United States Patent Office 3,229,105
Patented Jan. 11, 1966

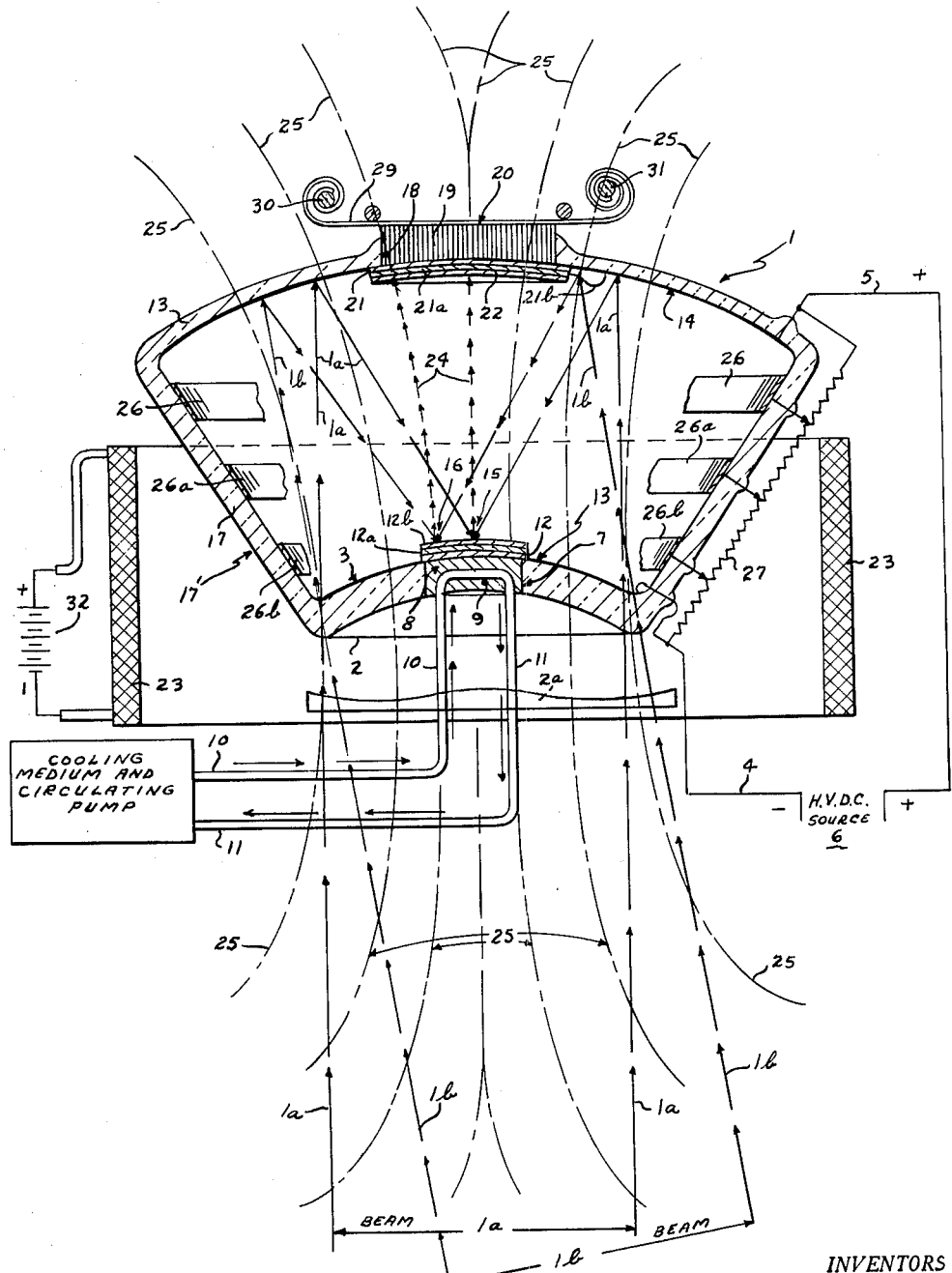

3,229,105
IMAGE INTENSIFIER DEVICE WITH MIRROR ON REAR SURFACE, PHOTOCATHODE ON FRONT SURFACE, AND FIBER OPTICS IN CENTER OF REAR SURFACE
Hermann R. Mestwerdt and Werner R. Rambauske, Dayton, Ohio, assignors to the United States of America as represented by the Secretary of the Air Force
Filed Oct. 4, 1962, Ser. No. 228,503
5 Claims. (Cl. 250—213)
(Granted under Title 35, U.S. Code (1952), sec. 266)

The invention described herein may be manufactured and used by or for the United States Government for governmental purposes without payment to us of any royalty thereon.

This invention relates to electro-optical apparatus, primarily for photographic reproductions, or observation by optical rays from a distant object, in which the optical rays are converted into electron rays for intensification after which they are reconverted to visible rays for observation or photographic reproduction.

The invention also proposes a camera or viewer for use under low ambient light level conditions consisting of a unique combination of an optical and electro-optical arrangement which exhibits an increased sensitivity and considerably higher contrast rendition combined with very good resolution, and provides an optical system having practically no chromatic and spherical aberrations.

An object of the invention is the provision of an improved viewer or camera apparatus, primarily for night photography or viewing without artificial illumination, having a large field of view in respect to its high aperture ratio with high resolution and contrast rendition.

A further object includes the provision of an electron emitting surface of a photocathode which is illuminated by incoming light from the same side where the photoelectric emission takes place, resulting in higher light absorption and considerably improved photoelectric efficiency.

A further object and advantage of the invention includes the provision of a photocathode which is deposited on a good electrical conductor which leads to a very uniform sensitivity distribution over the surface, in which the size of the photocathode is not limited by the electrical conduction to its center, as is the case in transparent photocathodes, and the cathode can be either a solid non-reflecting layer, or a semitransparent layer, deposited on a highly polished mirror substrate.

A further object of the invention includes the provision that this photocathode can be deposited with such a thickness that a constructive interference pattern for the incoming light rays can be achieved resulting in further increase of photoelectric efficiency for preferred wavelengths. For detailed explanation of this phenomenon see K. Deutscher (Zeitschrift fuer Physik, 151 (1958), pp. 536–555), translated by M. Marchant, Royal Aircraft Establishment, Code Nr. U.D.C. No. 621.383: 535.215.

A further object of the invention includes the provision of a photocathode which is deposited on a good metallic heat conductor, and the provision of cooling means for the heat conductor to provide for efficient cooling of the entire photocathode from means outside, to accomplish a considerably increased signal to noise ratio, and further, to provide an increased photocathode lifetime under cooled conditions, whereby less evaporation of the cathode takes place, and permits higher acceleration voltage to be used due to a reduction of field emission effects.

A further object is the provision of an electro-optical image intensifier camera device in which the incoming light does not penetrate a glass substrate, as is the case in a conventional converter, and thereby eliminates halation or multiple scattering of incoming light rays which degenerate the final resolution and contrast to a considerable extent.

A further object and advantage of the invention is the provision of an electro-optical camera or viewer in which the photocathode and screen electrode are deposited on spaced concentric spherical surfaces resulting in an ideal electrostatic field distribution, and the provision of a magnetic field which is very homogeneous because it is only employed in the central portions of the spherical surfaces.

A further object is the provision of an electro-optical image intensifier camera or viewer in which a "Maksutow"-meniscus lens forms the inner concentric spherical surface and the photocathode is mounted centrally thereon facing an outer concentric spherical surface which comprises a spherical mirror surface having an electron image receiving screen at the central portion thereof facing the photocathode which is larger in area than the photocathode and includes an annular conical wall between the inner and outer spherical surfaces or elements to provide an evacuated space therebetween, and includes means for creating a predetermined magnetic field having substantially straight lines of force between the photocathode and the screen for directing electrons from the photocathode to the larger screen element in diverging substantially straight lines to coincide with the diverging field lines of the electrostatic field.

Other objects and advantages of the invention will become apparent from the following description and accompanying drawing.

The figure of the drawing is a somewhat schematic longitudinal sectional view taken through the central axis of an image intensifier camera or viewer, illustrating the structure and principle employed in the invention, the long dash arrows indicating the incoming optical light rays while the very short dash arrows denote the electron beams from the photocathode to the screen plate or phosphor and the dot and dash lines represent substantially the magnetic lines of force through the device, particularly from the photocathode to the plate or phosphor screen.

In the drawing, the reference numeral 1a denotes an incoming light beam from a distance object located at, or substantially at infinity in which this beam 1a has its axis substantially concentric and parallel to the central axis of the image intensifier camera structure 1, while the numeral 1b denotes a similar but inclined or "off-axis" incoming beam from a distant object or target. These incoming light beams (1a or 1b, etc.) may be in the visible or in the invisible (infrared) portions of the spectrum.

An inner or small front spherical meniscus lens is indicated at 2 and may be what is well known as a Maksutow type lens, the same being transparent for the passage of the incoming light such as beams 1a and 1b therethrough, this spherical lens 2 having concentric inner and outer surfaces and may be electro-conductive, or it may have a rear substantially transparent electro-conductive coating or film 3, for example, of tin chloride (trade name "Nesa"), which is connected by an insulated conductor 4 to the negative terminal of a suitable high voltage electrical D.C. source 6.

Ordinarily a corrector plate is required in front of this system, such as, for instance, shown at 2a. The acceptance semi-angle of the exemplary arrangement shown is about 10°.

The central portion of the Maksutow lens member 2 is cored or recessed to provide a preferably circular or annular opening 7 in which is suitably sealed a cored metallic plug or insert 8 having a cooling fluid circulating passage 9 therein which is connected at its opposite ends to cooling medium supply and return conduits 10 and 11, connected in turn to a suitable coolant supply and circulating pump means, not shown in detail, for circulating a suitable cooling fluid (for instance, liquid nitrogen) through the plug member 8 to maintain the same at a desired low temperature.

The inner or convex surface of the plug 8 is provided with a highly polished coating or metallic layer 12, preferably of aluminum, having a spherical contour concentric to the curvature of the lens 2, on which is suitably imposed a thin transparent dielectric layer 12a. On this thin dielectric layer 12a is imposed a thin layer 12b of photoelectrically sensitive translucent material, such as a cesium-potassium-antimony compound, or the like, constituting a cathode plate member, the outer surface thereof preferably being spherical and concentric to the spherical curvature of the Maksutow lens 2.

Disposed in predetermined outwardly spaced concentric relation to the smaller spherical Maksutow lens 2 and the outer spherical surface of the cathode member 12 is a larger spherical mirror 13 having an opaque inner electroconductive full mirror reflecting surface 14, for instance, a polished aluminized coating, for reflecting all incoming optical rays, such as the beams 1a or 1b, back to the spherical surface of the photosensitive layer or cathode plate 12, substantially as shown in the drawing. The separation or space between the adjacent concentric surfaces of the cathode plate 12 and the spherical mirror 13 is important, and such that the optical rays from an object or scene located substantially at infinity distance passing through the Maksutow lens 2 and reflected by the mirror reflecting surface 14 will focus or concentrate at corresponding points, such as 15 (for the beam 1a), or 16 (for the beam such as the beam 1b).

The two concentric spherical surfaces of the mirror 13 and the Maksutow lens 2 are enclosed and hermetically sealed by an insulating truncated conical supporting wall or envelope 17, such as glass, preferably having an opaque coating 17′ to prevent the entrance of stray light from reaching the spherical mirror 14 other than through the Maksutow lens member 2. The edges or peripheries of the smaller Maksutow lens 2 and the larger spherical lens mirror 13 and the opaque truncated conical spacing and supporting envelope 17 are hermetically sealed. Since the lens 2, reflector 13, and envelope 17 are preferably made of glass (or a suitable plastic) they may be fused or cemented together in any conventional manner to provide an enclosure from which all air or gases are withdrawn in any conventional manner to provide a substantially perfect vacuum therein.

The central portion of the inner surface of the spherical mirror 13 is provided with a central circular opening 18, preferably having a substantially larger diameter or area than that of the cathode plate 12, in which is suitably fitted and hermetically sealed, in any suitable manner, a group of fiber optics 19 substantially positioned as shown, having their inner ends conforming to the spherical curvature of the reflecting surface 14 which surrounds this group of fiber optics 19.

As shown in the drawings, the group of fiber optics 19 extend outwardly beyond the outer surface of the spherical mirror 13 and terminate in a viewing or picture transmitting surface or plane 20 which is perpendicular to the central or longitudinal axis of the image intensifier camera or viewing device 1.

Disposed in or on the inner surface of the spherical reflector 13 in contact with the inner ends of the fiber optics group 19 is a conventional partially translucent phosphor screen 21, on which is disposed a thin aluminum layer 21a. A highly light absorbent layer 22 is superimposed on the aluminum layer 21a. The aluminum layer 21a is therefore sandwiched between the partially translucent phosphor screen 21 and the highly light absorbent layer 22 and is electrically connected to the electroconductive reflecting mirror surface 14 in any suitable manner, for instance as indicated at 21b.

The other or plus terminal of the high voltage direct current source 6 is electrically connected to the aluminized mirror reflecting surface layer 14 of the reflector lens 13 by an electrical conductor 5, the conductors 4 and 5 extending into the interior of the envelope 17 and sealed against leakage, in any well known manner.

Surrounding the exterior of the device is a magnetic field coil 23, concentric to the longitudinal axis thereof, for creating a magnetic field, indicated by the lines of force passing through the spherical Maksutow lens element 2 and the spherical reflector element 13, the lines of force being indicated by the dot and dash lines 25. The magnetic field coil 23 is suitably energized by a D.C. source such as a battery 32. The electromagnetic lines of force (field) 25, because of the axial displacement of the magnetic field coil 23 in the direction away from the spherical mirror 13 causes the lines of force 25 and the electrons 24 moving away from the photocathode plate 12 to the layer or phosphor 21 to spread uniformly in substantially straight lines, to excite a larger picture area on the phosphor 21 than the reflected optical picture area of the optical beams 1a or 1b striking the cathode plate 12 after reflection thereof from the mirror surface 14 of the spherical mirror 13.

If desired, the inner wall of the envelope 17 may be provided with a series of spaced parallel metallic bands 26, 26a and 26b, these bands being connected as shown, through a restrictive voltage divider network 27 to the electrical conductors 4 and 5 to provide a further stabilized outwardly diverging electrostatic field 25 from the cathode plate 12 to the phosphor 21, causing the electron streams to move in a better controlled way from their origin on the photocathode to the corresponding points on the phosphor member 21.

Thus, the combination of the magnetic field created by coil 23 and the electrostatic field existing between the conductive layer 3 of the Maksutow lens 2 and the mirror 14 reduces the circle of confusion considerably to provide a satisfactory intensified picture illumination at the phosphor 21 by the electrons 24.

The rear or outer plane, or viewing surface 20 receives through the fiber optics 19, the picture imposed on the phosphor 21 by the electron streams 24 following the diverging lines of force 25, and constitutes a visible optical viewing screen 20 where an enlarged intensified visual image of the selected object or target can be visually observed, or the same may be recorded photographically on a photographic film 29, suitably protected in a light excluding casing (not shown), and movable across the plane 20 between feeding and takeup spools 30 and 31 in a conventional manner.

The above description, relative to the cathode, illustrates the performance of the so-called "interference-cathode." Simpler arrangements, but not so efficient, are possible. For instance, it is possible to omit the dielectric layer 12a and to deposit the translucent cathode 12b directly on the mirror substrate 12. In this arrangement, the light which penetrates the cathode 12b is reflected by the mirror substrate 12 and penetrates from the rear side of the translucent cathode 12b thereby again releasing electrons. In a third version, the mirror substrate 12 could be completely eliminated and the cathode 12b could be made opaque thereby trapping more light than a transparent cathode would.

As mentioned, the electrostatic field lines are radially divergent because they are created between the conductive layer 3 on the Maksutow lens 2 and the conductive layer 14 on mirror 13, which form the surfaces of a spherical condenser. The axial displacement of the coil 23 towards the smaller lens 2 provides an expanding magnetic field toward the larger mirror 13 in which the lines of force in the central portion coincide substantially with the expanding electrostatic lines. The photo-cathode and the phosphor are located in this central portion of this electrostatic field and the electrons emitted from the photocathode are thus caused to follow the expanding field to the phosphor. The arrangement as shown, because of the large aperture of the lens 2 (surrounding the cathode and cooling plug 8) is ideal for low light level or infrared photography and provides an image intensifier which produces an enlarged final picture and has a comparatively large acceptance angle for the incoming optical beams over other known image conversion cameras and viewing devices.

It is also evident from the foregoing description of the particular embodiment that our invention in general is applicable in all fields which involve the principles of optics whenever it is required to produce a visible image of an object, and while a particular embodiment of the invention has been herein shown and described for the purpose of exemplification, it is understood and obvious that numerous minor changes may be made in the details of the construction and arrangement of parts without departing from the spirit of the invention or exceeding the scope of the appended claims.

We claim:

1. An electro-optical image intensifier device comprising, front and rear concentric spherical lens members disposed in a predetermined spaced relationship about a common radial center on a common central axis, said rear lens member having a larger diameter than said front lens member; and opaque truncated conical enclosing envelope sealed at its opposite ends to the peripheries of said front lens member and said larger diameter rear lens member to provide a vacuum chamber between said lens members, said vacuum chamber being evacuated to provide a vacuum therein; said front lens member being transparent and having it concave surface facing outwardly and forwardly; a transparent electroconductive surface on the inner convex surface of said front member coextensive therewith; a concentric metallic insert sealed in the central portion of the inner convex surface of the front lens member having a highly polished spherical convex reflecting surface facing said spherical rear lens member; a thin uniform dielectric layer disposed on said highly polished spherical convex reflecting surface; a translucent uniform electron emissive photocathode layer covering said dielectric layer in electrocontacting relation with said transparent electroconductive surface; an opaque concave electroconductive spherical full mirror reflecting surface disposed on the spherical concave surface of said rear lens member facing said front lens member for reflecting incoming substantially parallel optical rays from infinity, passing through said front lens member, back through said photocathode layer to corresponding focal points on said convex spherical reflecting surface of said metallic insert for corresponding release of electrons from said photocathode layer; a translucent concave phosphor layer disposed on said electroconductive full mirror reflecting surface in the central portion thereof, facing said photo cathode layer, and having a larger surface area than the surface area of said photocathode layer; a thin metallic photoelectron passing layer concentrically disposed on said phosphor layer in electrical contact with said opaque full mirror electroconductive reflecting surface; a coextensive highly light absorbing layer disposed on said thin metallic photoelectron passing layer; a high voltage D.C. source having a negative terminal connected to said front lens transparent electroconductive surface and a positive terminal connected through said opaque full mirror electroconductive reflecting surface to said thin metallic photoelectron passing layer; a circular group of fiber optics sealed in the central portion of said concave rear lens member having their inner ends exposed to and covering the area behind said translucent phosphor layer, extending outwardly through said rear lens member away from said phosphor layer, and terminating in an image viewing plane in rear of said rear lens member; an electromagnetic cylindrical field coil surrounding the exterior of said front lens member and the adjacent portion of said opaque truncated enclosing envelope; and D.C. means for energizing said field coil to produce a stabilized expanding magnetic field through said front and rear lens members to provide expanding lines of force through and between said photocathode and said phosphor layer in substantially straight diverging paths, whereby incoming optical rays from infinity passing through said front lens member in the transparent area thereof around said metallic insert to said rear concave opaque full mirror electroconductive reflecting surface are reflected back to said central convex highly polished reflecting surface of said metallic insert, and then through said photocathode layer to cause photoelectron flow along said lines of force to said larger phosphor layer for illuminating said phosphor layer and thus said fiber optics to provide an enlarged intensified image in the image viewing plane at the outer ends of said fiber optics of an image or target at infinity in front of said spherical front lens member.

2. An electro-optical image converter device comprising a pair of axially spaced circular smaller diameter front and larger diameter rear concentric spherical lens members, said front lens member comprising a transparent Maksutow lens having concentric spherical concave outer and convex inner surfaces, having a common radial center; a correction plate in front of said outer front concave surface; said rear lens member having an inner opaque spherical concave full mirror reflecting surface facing said inner convex surface of said front lens member and having a center of curvature concident with the center of curvature of said front lens member; an opaque frusto-conical enclosure connected at its opposite ends in sealed relation to the peripheries of said front and rear lens members to provide a vacuum chamber therebetween, said chamber being evacuated; a metallic plug concentrically sealed in the central portion of said front lens member to provide an annular transparent light passing area surrounding said plug for passing optical radiation from distant objects substantially at infinity through said surrounding area to said opaque spherical concentric concave full mirror reflecting surface of said rear lens member; said plug having a cooling passage formed therein; means for circulating a cooling medium through said cooling passage; said plug having an inner convex reflecting surface within said vacuum chamber coextensive with the inner convex surface of said front lens member; a photocathode layer disposed on the inner surface if said plug in insulated relation to said plug and having a spherical convex surface facing said rear lens member spaced to receive the optical radiation reflected by said mirror reflecting surface of said rear lens member at corresponding focal points on the spherical convex surface of said photocathode layer; said spherical rear lens member having an annular central opening in the opaque reflecting mirror surface thereof having a greater area than the facing area of said photocathode layer to provide an opaque spherical concentric concave full mirror reflecting surface surrounding said annular central opening; a group of fiber-optics closing said last opening in sealed relation thereto, extending outwardly from the concave surface of said rear lens member, and terminating in a visual image viewing plane in back of said rear lens member perpendicular to the optical axis thereof; said fiber-optics having their inner ends coextensive with the concave reflection surface of said rear lens member; a circular phosphor layer concentrically disposed on said inner ends of said group of fiber-optics and facing said photocathode layer; a high voltage D.C. source having a negative terminal connected to said photocathode layer and a positive terminal connected to said phosphor layer; a plurality of metallic bands disposed in spaced relation to each other around the interior of said frusto-conical enclosure in parallel planes between said front and rear lens members; a voltage divider network connected between said bands and said positive and negative terminals of said high voltage D.C. source for energizing said bands; a cylindrical electromagnetic field coil concentrically surrounding said frusto-conical enclosure and said front lens member, displaced axially in a direction away from said rear lens member to encircle said front lens member and only a portion of said enclosure to produce an expanding magnetic field through said rear lens member having diverging substantially straight lines of force passing through and between said photocathode layer and said phosphor layer to provide an expanding electron-guiding path from said photocathode layer to said phosphor layer; and means for energizing said coil to create said expanding magnetic field.

3. In an electro-optical image intensifier device for converting optical parallel light rays from an object at infinity to electron beams and reconverting said electron beams to visible light rays comprising, a truncated conical opaque nonconductive enclosing support having a central axis; a substantially transparent electroconductive circular spherical concave front member having concentric inner convex and outer concave spherical surfaces, and having its periphery hermetically sealed to the periphery of the smaller end of said truncated conical opaque support; a larger circular spherical rear member having a concave inner spherical reflecting surface disposed in predetermined spaced concentric relation to and facing the inner spherical convex surface of said front member, and having its periphery hermetically sealed to the larger end of said truncated conical support to form a vacuum chamber between said front and rear members; said vacuum chamber being evacuated to provide a substantially perfect vacuum therein; an opaque electroconductive full mirror coating covering the inner concave spherical surface of said rear member for reflecting parallel incoming optical rays passing through said front member back to corresponding points in the central portion of the convex spherical surface of said front member; an opaque electroconductive layer disposed on the central portion of said convex surface of said front member having a highly reflective surface substantially contiguous with the said convex spherical inner surface of said front member and in electrical contract with said electroconductive front member; a photocathode layer disposed on the last-mentioned electroconductive layer facing said rear member; a circular group of fiber optics extending through and hermetically sealed in the central portion of said concentric spherical rear member having the inner ends thereof contiguous with the spherical curvature of said opaque full mirror coating of said rear member and their outer ends disposed in a visual viewing plane perpendicular to said central axis for receiving a light sensitive film thereon; a thin phosphor layer covering the inner ends of said fiber optics; a thin electron passing metallic layer covering said phosphor layer in electrical contact with said opaque electroconductive spherical full mirror coating; a highly light absorbent layer covering said thin electron passing metallic layer; a high voltage D.C. source; an electrical conductor connected to said electroconductive spherical full mirror coating and to the positive terminal of said high voltage D.C. source; a second electrical conductor connected to said electroconductive front member for energizing said opaque electroconductive highly light reflective layer on the central portion of said front member and connected to the negative terminal of said high voltage D.C. source for establishing a D.C. potential between said photocathode layer and said phosphor layer; an electromagnetic field coil surrounding said front member and the adjacent portion of said truncated conical support in concentric spaced relation thereto; and electrical means connected to said field coil for energizing the same to establish a stabilized magnetic field through said central portions of said front and rear spherical concentric members having substantially straight lines of force through said photocathode layer and said phosphor layer, diverging outwardly in a direction from said photocathode layer to said phosphor layer for creating an expanding photoelectron magnetic guide field from the central portion of said front member to the concentric surface of said phosphor layer in the center of said concentric spherical rear member.

4. An electro-optical image intensifier device comprising an evacuated truncated conical vacuum chamber having a transparent circular electroconductive concave smaller front end and an axially spaced concentric circular spherical opposite rear end; a metallic insert sealed in the center of said electroconductive transparent concave smaller front end having a highly polished convex reflecting surface facing said larger rear end; a highly translucent dielectric layer disposed on and covering said convex reflecting surface of said metallic insert facing said larger rear end; a translucent uniform electron-emissive photocathode layer superimposed on and covering said translucent dielectric layer in electrical contact with said transparent electroconductive concave smaller front end, facing said larger rear end; an opaque electroconductive concave spherical full mirror reflecting surface within said chamber on said larger rear end facing said smaller front end in predetermined concentric spaced relation to said photocathode layer; a phosphor layer concentrically disposed on and covering the central portion of said full mirror reflecting surface; a thin circular metallic electron passing layer disposed on and covering said phosphor layer in electrical contact with said full mirror electroconductive reflecting surface for the passage of photoelectrons therethrough; a highly light absorbent layer disposed on and covering said electron passing layer; a group of fiber optics having their inner end disposed behind and in contact with said phosphor layer and extending rearwardly through said circular larger rear end and terminating in an image viewing plane in the rear of said larger end; a D.C. voltage source; means for connecting the negative terminal of said D.C. voltage source through said transparent circular electroconductive smaller front end to said photocathode layer and for connecting the positive terminal of said D.C. voltage source through said electroconductive spherical full mirror reflecting surface to said thin metallic electron passing layer to cause electron flow from said photocathode layer to said electron passing layer for selectively illuminating said phosphor layer and thus said fiber optics.

5. A device as claimed in claim 4 including a cylindrical field magnetic coil surrounding the exterior of said evacuated truncated conical vacuum chamber in axially displaced direction toward said smaller end; and means for energizing said coil to create an expanding stabilized magnetic field through the central portion of said chamber having lines of force expanding through said photocathode layer and said phosphor layer for guiding and stabilizing electron flow from said photocathode layer to said phosphor in substantially straight outwardly diverging directions.

References Cited by the Examiner
UNITED STATES PATENTS

| | | | |
|---|---|---|---|
| 2,683,816 | 7/1954 | Bouwers | 250—213 |
| 2,922,336 | 1/1960 | Van Alphen et al. | 250—213 |
| 2,950,405 | 8/1960 | Le Poole | 250—213 X |
| 2,966,592 | 12/1960 | Vogl et al. | 250—213 |
| 2,998,518 | 8/1961 | Guntert | 250—213 X |
| 3,045,117 | 7/1962 | Beatty | 250—49.5 |
| 3,058,021 | 10/1962 | Dunn | 250—213 |
| 3,081,402 | 3/1963 | Van Santen | 250—213 |

RALPH G. NILSON, *Primary Examiner.*

J. M. HORAN, *Examiner.*

E. STRICKLAND, *Assistant Examiner.*